United States Patent
Cermak et al.

(10) Patent No.: US 8,065,685 B2
(45) Date of Patent: Nov. 22, 2011

(54) METHOD, SYSTEM AND APPARATUS FOR A TRANSFORMATION ENGINE FOR USE IN THE PROCESSING OF STRUCTURED DOCUMENTS

(75) Inventors: Daniel M. Cermak, Austin, TX (US); Howard Tsoi, Austin, TX (US); John E. Derrick, Austin, TX (US); Richard Trujillo, Austin, TX (US); Udi Kalekin, Austin, TX (US); Bryan Dobbs, Round Rock, TX (US); Ying Fai Tong, Austin, TX (US); Brendon D. Cahoon, Austin, TX (US); Jack K. Matheson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1609 days.

(21) Appl. No.: 11/413,052

(22) Filed: Apr. 27, 2006

(65) Prior Publication Data

US 2009/0106775 A1     Apr. 23, 2009

Related U.S. Application Data

(60) Provisional application No. 60/675,349, filed on Apr. 27, 2005, provisional application No. 60/675,347, filed on Apr. 27, 2005, provisional application No. 60/675,167, filed on Apr. 27, 2005, provisional application No. 60/675,115, filed on Apr. 27, 2005.

(51) Int. Cl.
*G06F 17/00* (2006.01)
*G06F 3/00* (2006.01)

(52) U.S. Cl. ..................................... 719/318; 715/236

(58) Field of Classification Search ............... 715/236; 719/318
See application file for complete search history.

(56) References Cited

U.S. PATENT DOCUMENTS

| | | | |
|---|---|---|---|
| 7,287,217 B2 * | 10/2007 | Kuznetsov et al. | 715/235 |
| 7,590,644 B2 * | 9/2009 | Matsakis et al. | 1/1 |
| 2004/0010754 A1 * | 1/2004 | Jones | 715/513 |
| 2005/0086584 A1 * | 4/2005 | Sampathkumar et al. | 715/501.1 |
| 2006/0101393 A1 * | 5/2006 | Gerken et al. | 717/109 |

OTHER PUBLICATIONS

PCT/US06/16138 Search Report and Written Opinion mailed Aug. 16, 2007, 11 pgs.
Ambroziak, "Gregor, the Next Generation XSLT Compiler", Ambrosoft, Inc. Aug. 14, 2002. Retrieved from the Internet: <URL:http://web.archive.org/web/20020814080628/www.ambrosoft.com/gregor.html>, 6 pgs.
Jorgensen, "Introduction to XSLTC", Apache XML Project, Jun. 3, 2001, Retrieved from the Internet: <URL:http://web.archive.org/web/20010617150602/xml.apache.org/xsltc/index.html>, 3 pgs.

(Continued)

*Primary Examiner* — S. Sough
*Assistant Examiner* — Charles E Anya
(74) *Attorney, Agent, or Firm* — Blakely, Sokoloff, Taylor & Zafman LLP

(57) ABSTRACT

Systems, methods and apparatuses for embodiments of a transformation engine for structured documents are disclosed. More specifically, instruction code may be generated by a compiler from transformation instructions for a structured document. Embodiments of the transformation engine may comprise hardware circuitry operable to execute the instruction code to process a structured document according to the transformation instructions such that output for an output document is generated.

5 Claims, 10 Drawing Sheets

OTHER PUBLICATIONS

Jorgensen, "Using XSLTC", Apache XML Project, Aug. 5, 2001, Retreived from the Internet: <URL:http://web.archive.org/web/20010805201552/xml.apache.org/xalanj/xsltc_usage.html>, 11 pgs.

Miller, "The Translet API and TrAX", Apache XML Project, May 11, 2001, Retrieved from the Internet: <URL://http://web.archive.org/web/20010709121803/xml.apache.org/xalanj/xsltc_trax.html>, 11 pgs.

Punte, "Fast XSLT", XML.com, Apr. 2, 2003, Retrieved from the Internet: <URL:http:///www.xml.com/lpt/a/1186>, 5 pgs.

* cited by examiner

METHOD, SYSTEM AND APPARATUS FOR A TRANSFORMATION ENGINE FOR USE IN THE PROCESSING OF STRUCTURED DOCUMENTS

RELATED APPLICATIONS

This application claims a benefit of priority under 35 U.S.C. §119(e) to U.S. Provisional Patent Application Nos. 60/675,349, by inventors Howard Tsoi, Daniel Cermak, Richard Trujillo, Trenton Grale, Robert Corley, Bryan Dobbs and Russell Davoli, entitled "Output Generator for Use with System for Creation of Multiple, Hierarchical Documents", filed on Apr. 27, 2005; 60/675,347, by inventors Daniel Cermak, Howard Tsoi, John Derrick, Richard Trujillo, Udi Kalekin, Bryan Dobbs, Ying Tong, Brendon Cahoon and Jack Matheson, entitled "Transformation Engine for Use with System for Creation of Multiple, Hierarchical Documents", filed on Apr. 27, 2005; 60/675,167, by inventors Richard Trujillo, Bryan Dobbs, Rakesh Bhakta, Howard Tsoi, Jack Randall, Howard Liu, Yongjian Zhou and Daniel Cermak, entitled "Parser for Use with System for Creation of Multiple, Hierarchical Documents", filed on Apr. 27, 2005 and 60/675,115, by inventors John Derrick, Richard Trujillo, Daniel Cermak, Bryan Dobbs, Howard Liu, Rakesh Bhakta, Udi Kalekin, Russell Davoli, Clifford Hall and Avinash Palaniswamy, entitled "General Architecture for a System for Creation of Multiple, Hierarchical Documents", filed on Apr. 27, 2005 the entire contents of which are hereby expressly incorporated by reference for all purposes.

TECHNICAL FIELD OF THE INVENTION

The invention relates in general to methods, systems and apparatuses for processing structured documents, and more particularly, to the efficient processing, transformation or rendering of structured documents.

BACKGROUND OF THE INVENTION

Electronic data, entertainment and communications technologies are growing increasingly prevalent with each passing day. In the past, the vast majority of these electronic documents were in a proprietary format. In other words, a particular electronic document could only be processed or understood by the application that created that document. Up until relatively recently this has not been especially troublesome.

This situation became progressively more problematic with the advent of networking technologies, however. These networking technologies allowed electronic documents to be communicated between different and varying devices, and as these network technologies blossomed, so did user's desires to use these networked devices to share electronic data.

Much to the annoyance of many users, however, the proprietary formats of the majority of these electronic documents prevented them from being shared between different platforms: if a document was created by one type of platform it usually could not be processed, or rendered, by another type of platform.

To that end, data began to be placed in structured documents. Structured documents may be loosely defined as any type of document that adheres to a set of rules. Because the structured document conforms to a set of rules it enables the cross-platform distribution of data, as an application or platform may process or render a structured document based on the set of rules, no matter the application that originally created the structured document.

The use of structured documents to facilitate the cross-platform distribution of data is not without its own set of problems, however. In particular, in many cases the structured document does not itself define how the data it contains is to be rendered, for example for presentation to a user. Exacerbating the problem is the size of many of these structured documents. To facilitate the organization of data intended for generic consumption these structured documents may contain a great deal of meta-data, and thus may be larger than similar proprietary documents, in some cases up to twenty times larger or more.

In many cases, instructions may be provided for how to transform or render a particular structured document. For example, one mechanism implemented as a means to facilitate processing XML is the extensible stylesheet language (XSL) and stylesheets written using XSL. Stylesheets may be written to transform XML documents from one markup definition (or "vocabulary") defined within XML to another vocabulary, from XML markup to another structured or unstructured document form (such as plain text, word processor, spreadsheet, database, pdf, HTML, etc.), or from another structured or unstructured document form to XML markup. Thus, stylesheets may be used to transform a document's structure from its original form to a form expected by a given user (output form).

Typically, structured documents are transformed or rendered with one or more software applications. However, as many definitions for these structured languages were designed and implemented without taking into account conciseness or efficiency of parsing and transformation, the use of software applications to transform or render these structured documents may be prohibitively inefficient.

Thus, as can be seen, there is a need for methods and systems for an architecture for the efficient processing of structured documents.

BRIEF DESCRIPTION OF THE DRAWINGS

The drawings accompanying and forming part of this specification are included to depict certain aspects of embodiments of the invention. A clearer impression of embodiments of the invention, and of the components and operation of systems provided with embodiments of the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Before describing embodiments of the present invention it may be useful to describe an exemplary architecture for a web service. Although web services are known in the art, a description of such an architecture may be helpful in better explaining the embodiments of the invention depicted herein.

Figure 1:
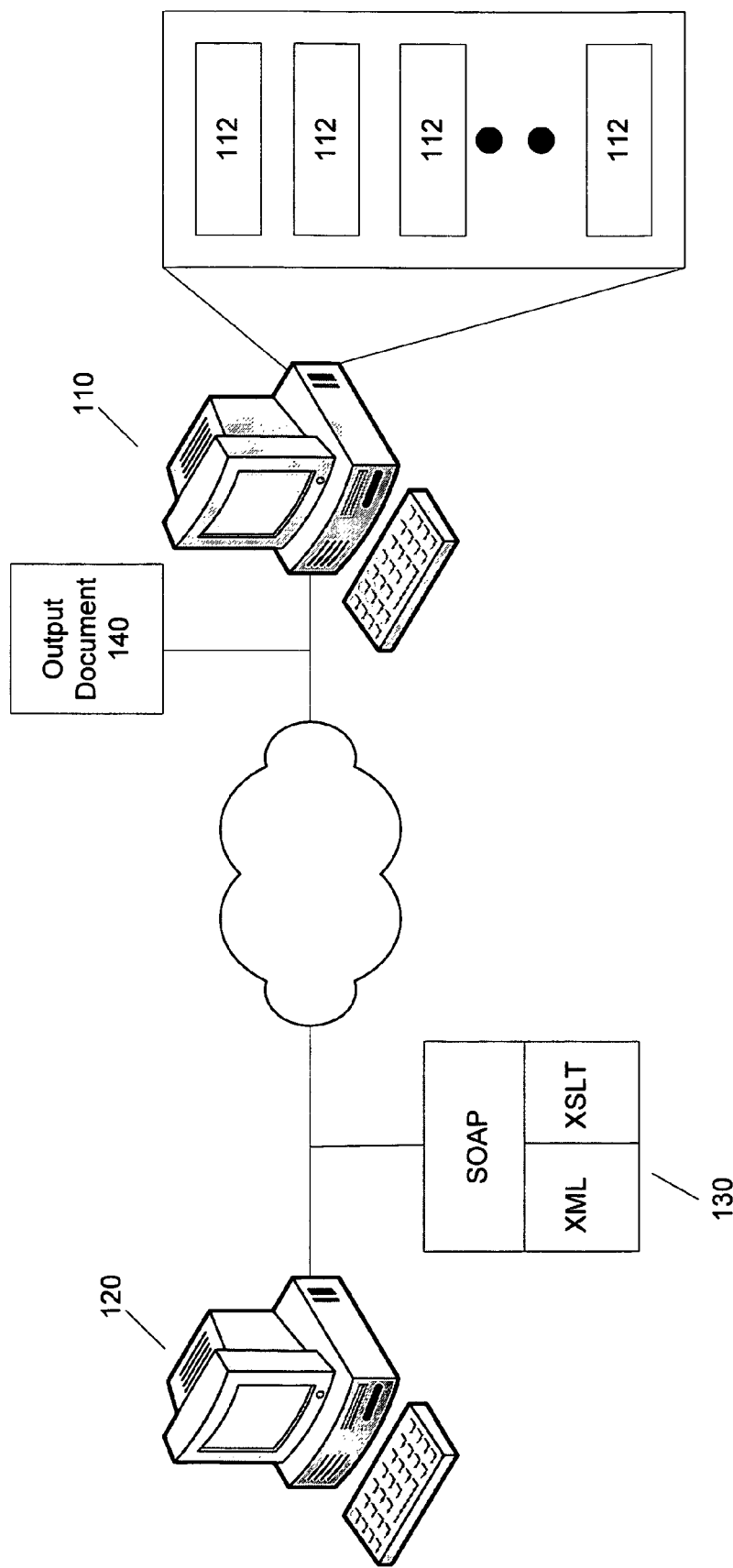
FIG. 1 depicts an embodiment of an architecture for the implementation of web services.

FIG. 1 depicts an embodiment of one such architecture for implementing a web service. Typically, web services provide a standard means of interoperating between different software applications running on a variety of platforms and/or frameworks. A web service provider 110 may provide a set of web services 112. Each web service 112 may have a described interface, such that a requestor may interact with the web service 112 according to that interface.

For example, a user at a remote machine 120 may wish to use a web service 112 provided by web service provider 110. To that end the user may use a requestor agent to communicate message 130 to a service agent associated with the desired web service 112, where the message is in a format prescribe by the definition of the interface of the desired web service 112. In many cases, the definition of the interface describes the message formats, data types, transport protocols, etc. that are to be used between a requester agent and a provider agent.

The message 130 may comprise data to be operated on by the requested web service 112. More particularly, message 130 may comprise a structured document and instructions for transforming the structured document. For example, message 130 may be a SOAP (e.g. Simple Object Access Protocol) message comprising an eXtensible Markup Language (XML) document and an XSL Transformation (XSLT) stylesheet associated with the XML document. It should be noted that, in some cases, transformation instructions (e.g. a DTD, schema, or stylesheet) may be embedded in a structured document, for example, either directly or as a pointer. In such cases the transformation instructions may be extracted from the document before being utilized in any subsequent method or process.

Thus, in some cases the provider agent associated with a particular web service 112 may receive message 130; web service 112 may process the structured document of message 130 according to the instructions for transforming the structured document included in message 130; and the result 140 of the transformation returned to the requester agent.

In some cases, many structured documents may be sent to a particular web service 112 with one set of transformation instructions, so that each of these documents may be transformed according to the identical set of instructions. Conversely, one structured document may be sent to a particular web service 112 with multiple sets of transformation instructions to be applied to the structured document.

Hence, as can be seen from this brief overview of the architecture for implementing web services 112, it may be highly desired to process these structured documents as efficiently as possible such that web services 112 may be used on many data sets and large data sets without creating a bottleneck during the processing of the structured documents and processing resources of web service provider 110 may be effectively utilized.

Attention is now directed to embodiments of systems, methods and apparatuses for a general architecture for the efficient transformation or processing of structured documents. Embodiments of the present invention may allow a transformation to be performed on a structured document according to transformation instructions. To this end, embodiments of the architecture may comprise logical components including a parser, a pattern expression processor, a transformation engine and an output generator, one or more of which may be implemented in hardware circuitry, for example a hardware processing device such as an Application Specific Integrated Circuit (ASIC) which comprises all the above mentioned logical components More particularly, embodiments of the invention may compile the transformation instructions to create instruction code and a set of data structures. The parser parses the structured document associated with the transformation instructions to generate structures representative of the structured document. The parse-time expression processor (PEP) identifies data in the structured document corresponding to definitions in the transformation instructions. The transformation engine transforms the parsed document or identified data according to the transformation instructions and the output generator assembles this transformed data into an output document.

By compiling transformation instructions and processing the structured document accordingly, certain efficiency advantages may be attained by embodiments of the present invention. Specifically, the transformation instructions may be analyzed to determine which of the transformation instructions may be executed substantially simultaneously, or in parallel, to speed the transformation of a structured document. Similarly, by analyzing a structured document before the transformation takes place, similar content in a structured document may be identified such that any transformations on this content may also be done substantially in parallel. Likewise, by producing instruction code from transformation instructions where the code is executable to transform at least a portion of a structured document, multiple sets of instruction code corresponding to various jobs, may also be executed in parallel.

Certain other advantages may also accrue to the architecture described according to embodiments of the present invention. As mentioned above, in one embodiment the compiler may be implemented in software and the logical components for the architecture implemented in hardware. In many cases, transformation instructions (e.g. stylesheets and/or schemas, etc.) may change relatively infrequently as compared to the number of documents being processed. For example, a given stylesheet may be applied to multiple documents before any changes to a stylesheet are made (e.g. to an updated stylesheet or to apply a different stylesheet altogether). Accordingly, capturing the relatively invariant information from the transformation instructions in data structures that may be efficiently accessed by dedicated, custom hardware (e.g. logical components) may provide a high performance solution to the transformation of structured documents. Additionally, having compilation of transformation instructions performed in software provides the flexibility to accommodate different formats for transformation instructions and to implement changes in the language specifications for these transformation instructions without having to change the custom hardware. For example, XSLT, XPath, and XML schema may evolve and new features added to these languages in the future. The compiler may be adapted to handle these new features.

While the advantages discussed above have been discussed with respect to a compiler implemented in software and logical components implemented in hardware, in other embodiments, the compiler may be implemented in hardware; one or more of the logical components may be implemented in software; or both the logical components and compiler may be implemented in a combination of hardware and software.

Figure 2:
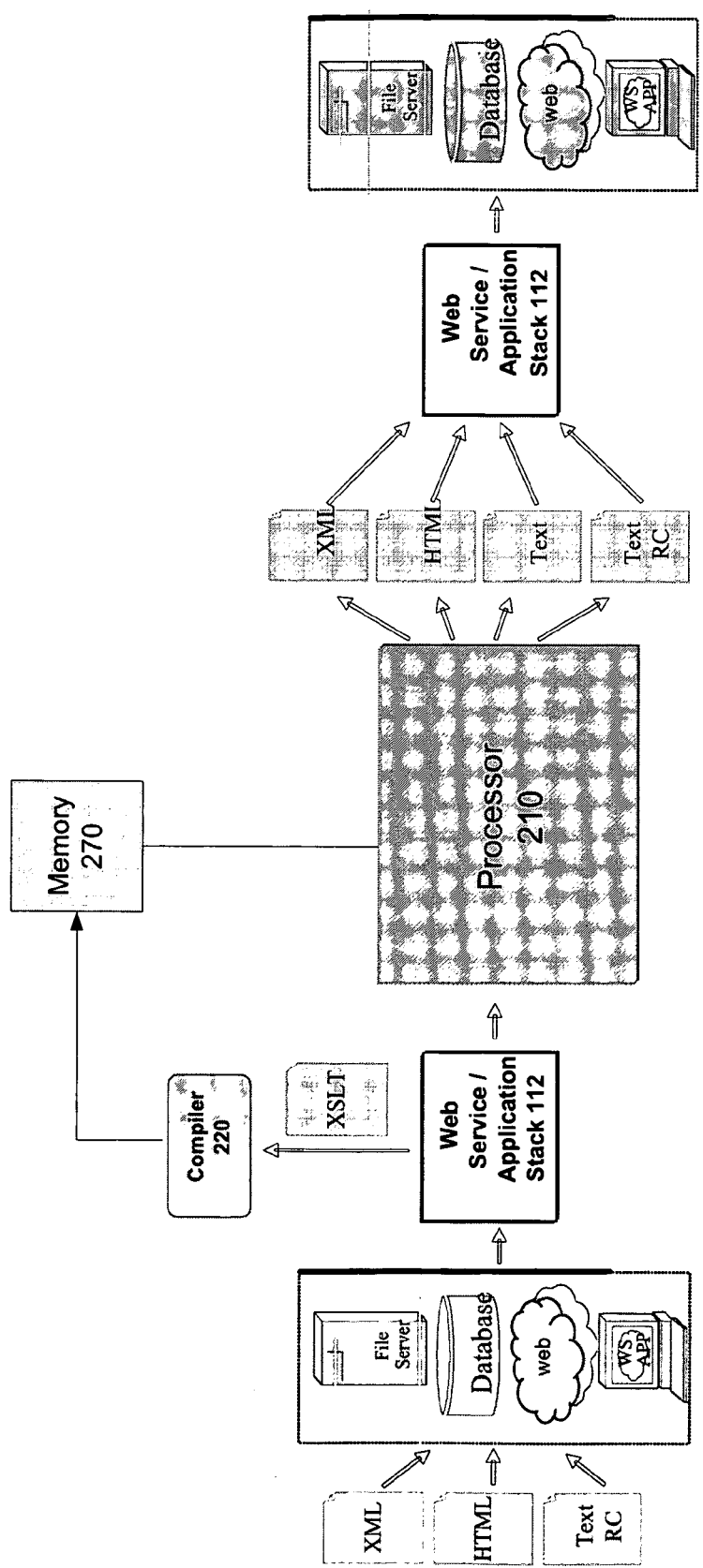
FIG. 2 depicts one embodiment of the processing of structured documents using a document processor.

Turning to FIG. 2, a block diagram for the transformation of structured documents using embodiments of the present invention is depicted. A structured document may be received at a web service 112 from a variety of sources such as a file server, database, internet connection, etc. Additionally, a set of transformation instructions, for example an XSLT stylesheet, may also be received. Document processor 210 may apply the transformation instructions to the structured document to generate an output document which may be returned to the requesting web service 112, which may, in turn, pass the output document to the requester.

In one embodiment, compiler 220, which may comprise software (i.e. a plurality of instructions) executed on one or more processors (e.g. distinct from document processor 210) may be used to compile the transformation instructions to generate data structures and instruction code in memory 270 for use by document processor 210. Document processor 210 may be one or more ASICs operable to utilize the data structures and instruction code generated by compiler 220 to generate an output document.

Figure 3:
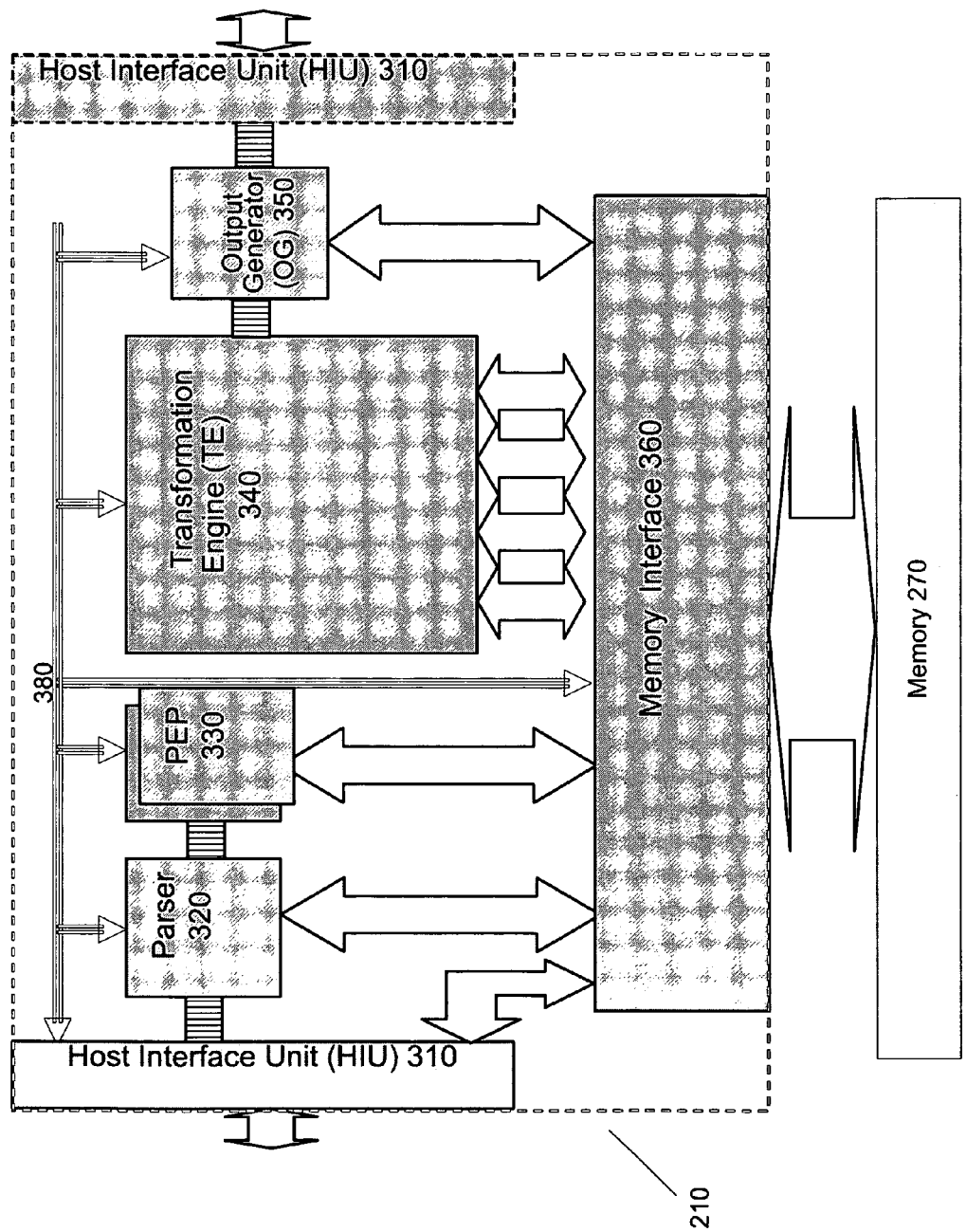
FIG. 3 depicts one embodiment of an architecture for a device for the processing of structured documents.

FIG. 3 depicts a block diagram of one embodiment of an architecture for a document processor operable to produce an output document from a structured document. Document processor 210 comprises Host Interface Unit (HIU) 310, Parser 320, PEP 330, Transformation Engine (TE) 340, Output Generator (OG) 350, each of which is coupled to memory interface 360, to Local Command Bus (LCB) 380 and, in some embodiments, to one another through signal lines or shared memory 270 (e.g. a source unit may write information to be communicated to a destination unit to the shared memory and the destination unit may read the information from the shared memory), or both. Shared memory 270 may be any type of storage known in the art, such as RAM, cache memory, harddisk drives, tape devices, etc.

HIU 310 may serve to couple document processor 210 to one or more host processors (not shown). This coupling may be accomplished, for example, using a Peripheral Component Interconnect eXtended (PCI-X) bus. HIU 310 also may provide an Applications Programming Interface (API) through which document processor 210 can receive jobs. Additionally, HIU 310 may interface with LCB 380 such that various tasks associated with these jobs may be communicated to components of document processor 210.

In one embodiment, these jobs may comprise context data, including a structured document and the data structures and instruction code generated from the transformation instructions by the compiler. Thus, the API may allow the context data to be passed directly to HIU 310, or, in other embodiments, may allow references to one or more locations in shared memory 270 where context data may be located to be provided to HIU 310. HIU 310 may maintain a table of the various jobs received through this API and direct the processing of these jobs by document processor 210. By allowing multiple jobs to be maintained by HIU 310, these jobs may be substantially simultaneously processed (e.g. processed in parallel) by document processor 210, allowing document processor 210 to be more efficiently utilized (e.g. higher throughput of jobs and lower latency).

Parser 320 may receive and parse a structured document, identifying data in the structured document for PEP 330 and generating data structures comprising data from the structured document by, for example, creating data structures in shared memory 270 for use by TE 340 or OG 350.

PEP 330 receives data from parser 320 identifying data of the structured document being processed and compares data identified by the parser 320 against expressions identified in the transformation instructions. PEP 330 may also create one or more data structures in shared memory 270, where the data structures comprises a list of data in the structured document which match expressions.

Transformation engine 340 may access the data structures built by parser 320 and PEP 330 and execute instruction code generated by compiler 220 and stored in memory 270 to generate results for the output document. In some embodiments, one or more instructions of the instruction code generated by compiler 220 may be operable to be independently executed (e.g. execution of one instruction does not depend directly on the result of the output of the execution of another instruction), and thus execution of the instruction code by transformation engine 340 may occur in substantially any order.

Output generator 350 may assemble the results generated by transformation engine 340 in an order specified by the transformation instructions or corresponding to the structured document and provide the output document to the initiating web service 112 through HIU 310, for example, by signaling the web service 112 or a host processor that the job is complete and providing a reference to a location in memory 270 where an output document exists.

While it should be understood that embodiments of the present invention may be applied with respect to almost any structured document (e.g. a document having a defined structure that can be used to interpret the content) whether the content is highly structured (such as an XML document, HTML document, .pdf document, word processing document, database, etc.) or loosely structured (such as a plain text document whose structure may be, e.g., a stream of characters) and associated transformation instructions (which is used generally referred to a file which may be used with reference to a structured document e.g. document type definitions (.dtd) schema such as .xsd files, XSL transformation files, etc.) for the structured document, it may be helpful to illustrate various embodiments of the present invention with respect to a particular example of a structured document and transformation instructions.

Generally, an XML document is a structured document which has a hierarchical tree structure, where the root of the tree identifies the document as a whole and each other node in the document is a descendent of the root. Various elements, attributes, and document content form the nodes of the tree. The elements define the structure of the content that the elements contain. Each element has an element name, and the element delimits content using a start tag and an end tag that each include the element name. An element may have other elements as sub-elements, which may further define the structure of the content. Additionally, elements may include attributes (included in the start tag, following the element name), which are name/value pairs that provide further information about the element or the structure of the element content. XML documents may also include processing instructions that are to be passed to the application reading the XML document, comments, etc.

An XSLT stylesheet is a set of transformation instructions which may be viewed as a set of templates. Each template may include: (i) an expression that identifies nodes in a document's tree structure; and (ii) a body that specifies a corresponding portion of an output document's structure for nodes of the source document identified by the expression. Applying a stylesheet to a source document may comprise attempting to find a matching template for one or more nodes in the source document, and instantiating the structures corresponding to the body of the matching template in an output document.

The body of a template may include one or more of: (i) literal content to be instantiated in the output document; (ii) instructions for selection of content from the matching nodes to be copied into the output document; and (iii) statements that are to be evaluated, with the result of the statements being instantiated in the output document. Together, the content to be instantiated and the statements to be evaluated may be referred to as "actions" to be performed on the nodes that match the template.

The body of a template may include one or more "apply templates" statements, which include an expression for selecting one or more nodes and causing the templates in the stylesheet to be applied to the selected nodes, thus effectively nesting the templates. If a match to the apply templates statement is found, the resulting template is instantiated within the instantiation of the template that includes the apply templates statement. Other statements in the body of the template may also include expressions to be matched against nodes (and the statements may be evaluated on the matching nodes).

The expressions used in a stylesheet may generally comprise node identifiers and/or values of nodes, along with operators on the node identifiers to specify parent/child (or ancestor/descendant) relationships among the node identifiers and/or values. Expressions may also include predicates, which may be extra condition(s) for matching a node. A predicate is an expression that is evaluated with the associated node as the context node (defined below), where the result of the expression is either true (and the node may match the expression node) or false (and the node does not match the expression). Thus, an expression may be viewed as a tree of nodes to be matched against a document's tree.

A given document node may satisfy an expression if the given document node is selected via evaluation of the expression. That is, the expression node identifiers in the expression match the given document node's identifier or document node identifiers having the same relationship to the given document node as specified in the expression, and any values used in the expression are equal to corresponding values related to the given document node.

A document node may also be referred to as a "matching node" for a given expression if the node satisfies the given expression. In some cases in the remainder of this discussion, it may be helpful for clarity to distinguish nodes in expression trees from nodes in a structured document. Thus, a node may be referred to as an "expression node" if the node is part of an expression tree, and a node may be referred to as a "document node" if the node is part of the document being processed. A node identifier may comprise a name (e.g. element name, attribute name, etc.) or may comprise an expression construct that identifies a node by type (e.g. a node test expression may match any node, or a text test expression may match any text node). In some cases, a name may belong to a specific namespace. In such cases, the node identifier may be a name associated with a namespace. In XML, the namespace provides a method of qualifying element and attribute names by associating them with namespace names. Thus, the node identifier may be the qualified name (the optional namespace prefix, followed by a colon, followed by the name). A name, as used herein (e.g. element name, attribute name, etc.) may include a qualified name. Again, while XSLT stylesheets may be used in one example herein of transformation instructions, generally a "transformation instructions" may comprise any specification for transforming a source document to an output document, which may encompass, for example, statements indented to identify data of the source document or statements for how to transform data of the source document. The source and output documents may be in the same language (e.g. the source and output documents may be different XML vocabularies), or may differ (e.g. XML to pdf, etc.).

Figure 4:
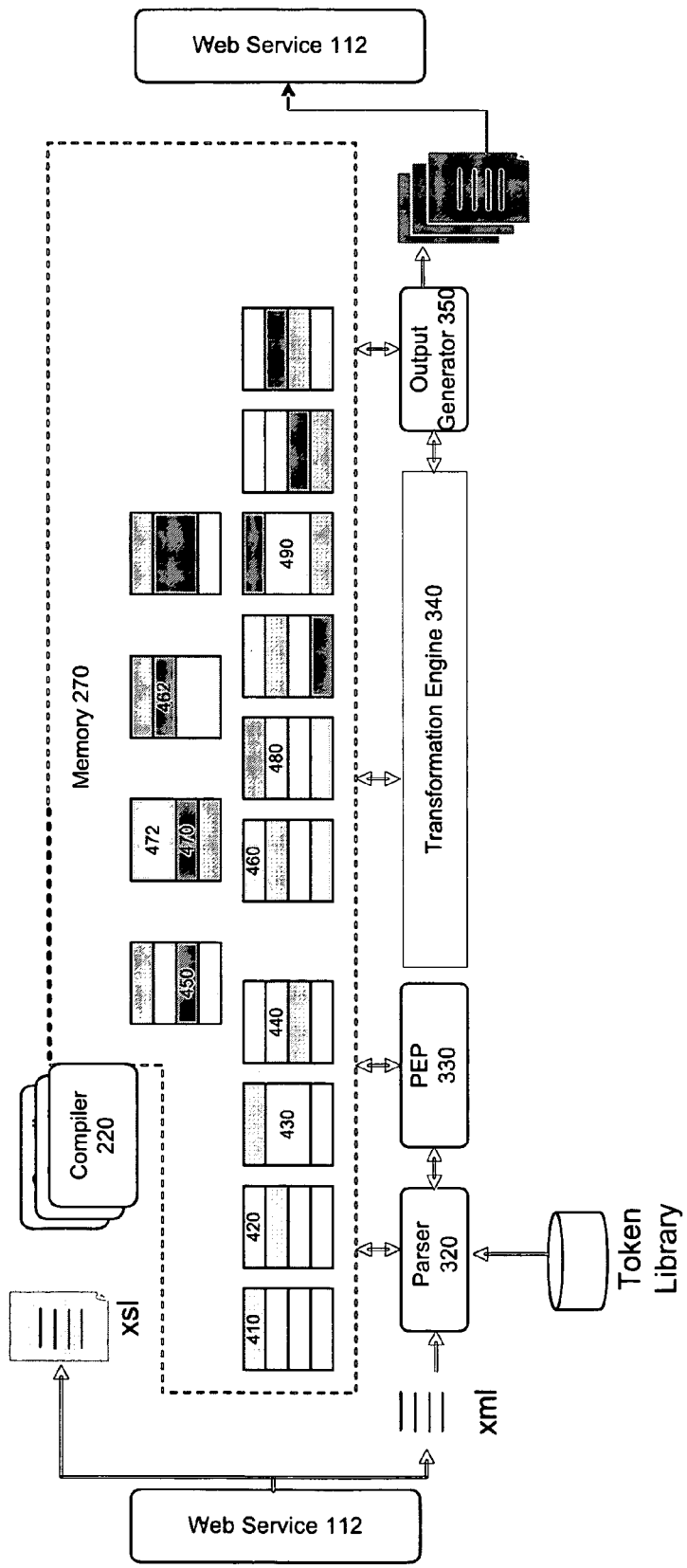
FIG. 4 depicts one embodiment of an architecture for the processing of structured documents utilizing an embodiment of the device depicted in FIG. 3.

Moving now to FIG. 4, an example application of one embodiment of the present invention to an XML document and an XSLT stylesheet is illustrated. It is noted that, while the description herein may include examples in which transformation instructions are applied to a single source document, other examples may include applying multiple sets of transformation instructions to a source document (either concurrently or serially, as desired) or applying a set of transformation instructions to multiple source documents (either concurrently with context switching or serially, as desired).

Returning to the example of FIG. 4, an XML document and an associated XSL stylesheet may be received by web service 112. Web service 112 may invoke embodiments of the present invention to transform the received document according to the received stylesheet. More specifically, in one embodiment, compiler 220 may be used to compile the XSL stylesheet to generate data structures and instruction code for use by document processor 210. Compiler 220 may assign serial numbers to node identifiers in the stylesheet so that expression evaluation may be performed by document processor 210 by comparing numbers, rather than node identifiers (which would involve character string comparisons).

Compiler 220 may also store a mapping of these node identifiers to serial numbers in one or more symbol tables 410 in memory 270. Additionally, compiler 220 may extract the expressions from the stylesheet and generate expression tree data structures in memory 270 to be used by the document processor 210 for expression matching (e.g. one or more parse-time expression trees 420 comprising expression nodes). Still further, compiler 220 may generate an instruction table 430 in memory 270 with instructions to be executed for one or more matching expressions. The instructions in the instruction table 430 may be executable by document processor 210 that, when executed by the document processor 210, may result in performing the actions defined when an expression associated with the instruction is matched. In some embodiments, the instructions may comprise the actions to be performed (i.e. there may be a one-to-one correspondence between instructions and actions). In other embodiments, at least some actions may be realized by executing two or more instructions. The compiler may also generate whitespace tables 440 defining how various types of whitespace in the source document are to be treated (e.g. preserved, stripped, etc.), an expression list table 450, a template list table 460 and one or more DTD tables 462 to map entity references to values or specify default values for attributes.

At this point, processing of the source document by document processor 210 may begin. Parser 320 receives the structured document and accesses the symbol tables 410, whitespace tables 440, or DTD tables 462 in memory 470 to parse the structured document, identify document nodes, and generate events (e.g. to identify document nodes parsed from the document) to PEP 330. More particularly, parser 320 converts node identifiers in the source document to corresponding serial numbers in the symbol tables 410, and transmits these serial numbers as part of the events to the PEP 330. Additionally, parser 320 may generate a parsed document tree 470 representing the structure of the source document in memory. Nodes of the parsed document tree may reference corresponding values stored in one or more parsed content tables 472 created in memory by parser 320. PEP 330 receives-events from the parser 320 and compares identified document nodes (e.g. based on their serial numbers) against parse-time expression tree(s) 420 in memory 270. Matching document nodes are identified and recorded in template or expression match lists 480 in memory 270.

Transformation engine 340 executes instructions from instruction table 430. When executing these instructions, transformation engine 430 may accesses the template or expression match lists 480, the parsed document tree 470, the parsed content tables 472 or the instruction table 430 in memory 270. These instructions may, in turn, be associated with one or more templates of a stylesheet. Transformation engine 340 may execute the instructions on each of the document nodes that matches the expression associated with the template, for example to transform or format document nodes according to the template. Transformation engine 340 may request that the results of the execution of these instructions to be stored in one or more output data structures 490 in memory 270. Thus, as transformation engine 340 executes instructions of instruction table 430, a set of output data structures 490 are created in memory 270 representing the structure of an output document, and content for the output document placed in, or associated with, these output data structures 490.

Output generator 350 may receive results from transformation engine 340 for storing in output data structures 490 in memory 270. Output generator may access these output data structures 490 to assemble an output document. In some embodiments, output generator 350 may access a set of formatting parameters for the assembly of the output document. After the output document is assembled, or as the output document is being assembled, the output document (or portions thereof) may be returned to the proper web service 112.

Thus, when parser 320 and PEP 330 (collectively referred to as the front end of processor 210) have finished processing a structured document a set of data structures exist in memory 270 representing the structured document and sets of nodes in the structured document which match expressions of the transformation instructions. The transformation engine 340 may execute the instructions of the instruction table 430 (generated by the compiler from the transformation instructions) utilizing these data structures to perform the transformation or formatting operations specified in the transformation instructions.

Many of the instructions may be executable with respect to one or more matching nodes of a document. As it is desired to maximize throughput and decrease latency when applying these instructions to a document it may be desired to execute instructions of this type on each of a set of document nodes substantially simultaneously. Additionally, certain instructions may occur with a relatively high degree of frequency within the instructions. It may be desired to optimize the processing of these types of instructions, as significant gains in efficiency may be achieved by reducing the time it takes to process these instructions because of the frequency with which these types of instructions occur.

To this end, in certain embodiments, transformation engine 340 may comprise a set of interconnected logical processing units which operate substantially in tandem to execute instructions generated from the transformation instructions by the compiler to generate results which output engine 350 may assemble into an output document. The logical processing units of transformation engine 340 may comprise one or more application engines for processing these instructions and one or more dedicated hardware accelerators. By utilizing multiple application engines multiple instructions may be processed substantially in parallel, while dedicated hardware accelerators may allow the processing of frequently occurring instructions by dedicated hardware circuitry, increasing the speed of execution of these instructions. By processing instructions in parallel and speeding the processing of frequently occurring instructions, throughput may be maximized and latency minimized.

Figure 5:
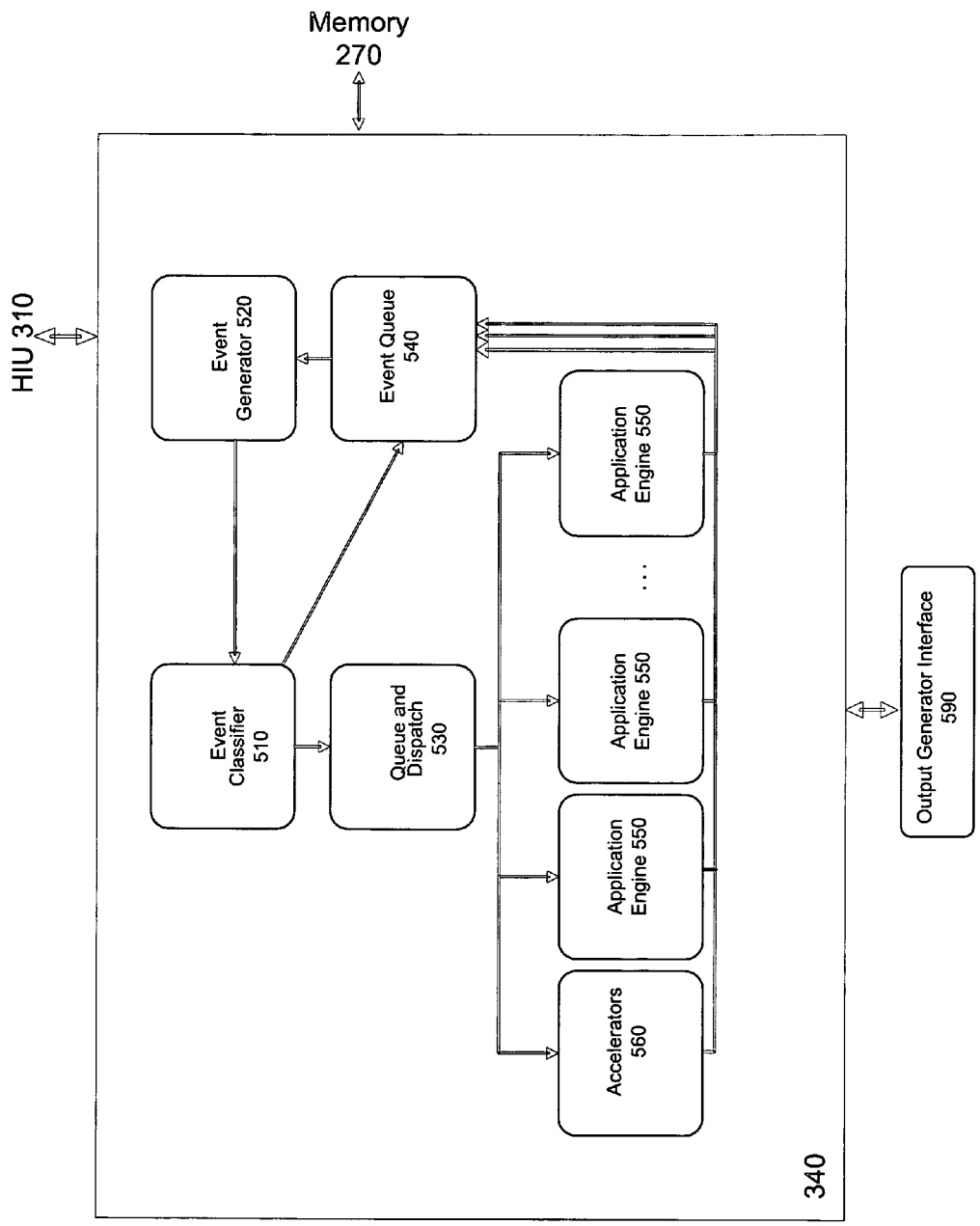
FIG. 5 depicts an architecture for an embodiment of a transformation engine.

One particular embodiment of a transformation engine is depicted in FIG. 5. Transformation engine 340 may interface with memory 270 (e.g. through memory interface 360), HIU 310 through local command bus 380 and output generator 350 through output generator interface 590. Transformation engine 340 may receive one or more commands to initiate processing of a document (e.g. from HIU 310) and associated data for that job. Output or results generated by transformation engine 340 in accordance with the processing of the structured document, or other communications, may be passed to output generator 350 through output generator interface 590, which in one embodiment may comprise one or more dedicated buses between transformation engine 340 and output generator 350 which allow transformation engine 340 to place data in a First In First Out (FIFO) queue for output generator 590 or request that output generator 350 establish one or more output data structures 490 (e.g. output data structures) in memory 270 and return a reference to the data structure.

Transformation engine 340 may comprise event classifier 510, event generator 520, dispatch queue 530, event queue 540, application engines 550 and accelerators 560. Event classifier 510 is coupled to dispatch queue 530, event generator 520 and event queue 540 which, in turn, is coupled to event generator 520. Dispatch queue 530 is coupled to each of application engines 550 and accelerators 560 while each of application engines 550 may also be coupled to event queue 540.

Transformation engine 340 may operate on events, where these events comprise an instruction and a context. The instruction may comprise a command with an opcode and a set of data associated with the opcode while the context may describe an execution environment for the instruction and may comprise memory addresses for an event's instruction and data memory regions, an output table pointer identifying a location for the output of the instruction, a context frame with references to runtime data, a node or node-set to be processed, etc. These events may be grouped into two types, events which comprise instructions generated by the compiler directly from stylesheet instructions (e.g. instructions in instruction table 430), referred to as template events, and generated events generated through the processing of other events (e.g. template events).

Figure 6:
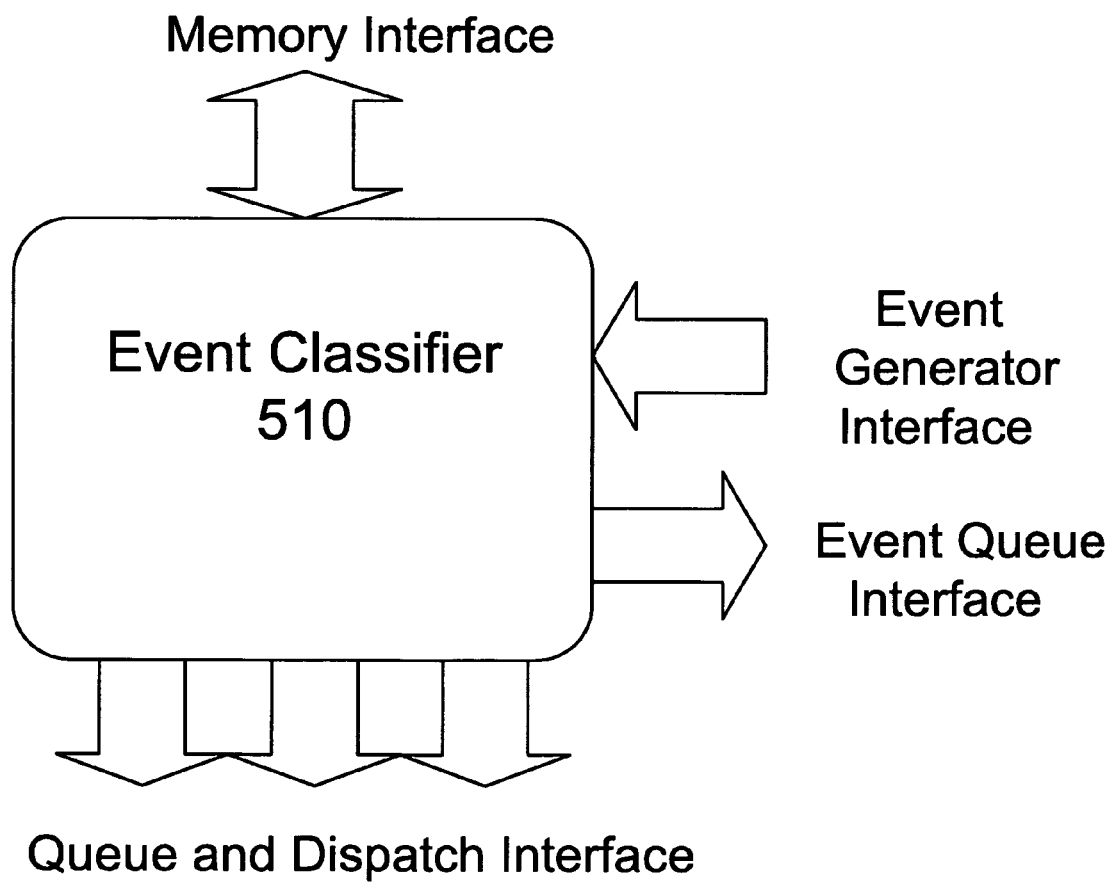
FIG. 6 depicts one embodiment of an event classifier.

FIG. 6 depicts one embodiment of event classifier 510. Event classifier 510 may interface with memory 270, event generator 520, event queue 540 and queue and dispatch interface 530. Event classifier 510 is operable to fetch instructions from instruction table 430 in memory 270 and generate an event (e.g. a template event) from the instruction by combining the fetched instruction with a corresponding context. Event classifier 520 may also receive events (e.g. generated events) from event generator 520.

During operation of transformation engine 340, event classifier 510 may route these events to dispatch queue 530, event queue 540 or one of hardware accelerators 560 based on the opcode of the instruction associated with an event. Furthermore, event classifier 510 may prioritize the handling of these events. More particularly, in one embodiment, a priority may be associated with each event. In addition to routing an event based upon an opcode associated with the event, the event may also be routed based on the priority associated with the event. For example, a relatively low priority event may be routed to event queue 540, even through the event may currently be in a condition to be executed by one of application processors 550 or hardware accelerators 560. This may force the event to pass through event queue 540 and event generator 520 before once again arriving at event classifier 510. By delaying the execution of this low priority event by at least the time it takes the event to navigate the circular data path from event classifier 510, through event queue 540 and event generator 520 before arriving again at event classifier 510, relatively higher priority events may be executed in the intervening time span. Moreover, the priority of an event may be associated with its circulation through a particular data path. An event may be tagged as having been "recirculated" by an application engine 550 (described more fully below). Being tagged as having been recirculated may further reduce the priority of an event to fully allow dependencies of such an event to be processed before the event is forwarded to dispatch queue 530.

Figure 7:
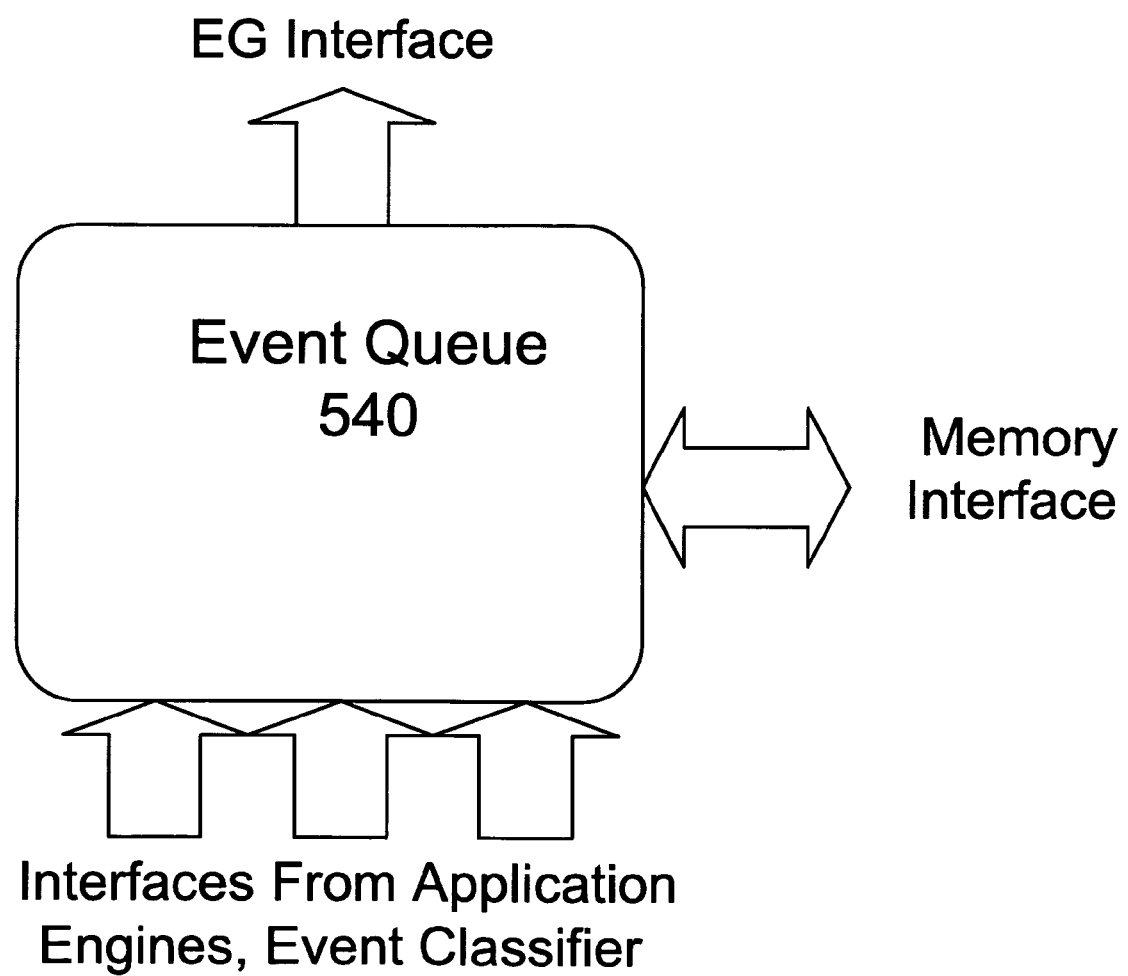
FIG. 7 depicts one embodiment of an event queue.

Turning now to FIG. 7, one embodiment of an event queue is depicted. Event queue 540 may comprise a buffer implemented in hardware into which events may be placed through interfaces including an interface with event classifier 510 and each application engine 550. Event queue 540 may have an interface with memory 270 such that if the hardware buffer associated with event queue 540 is filled and event queue 540 receives additional events through event interfaces these newly received events may be placed in an overflow area in memory 270. In one embodiment, the hardware buffer of event queue 540 may comprise one or more bins, where each bin is associated with the priority of an event. Thus, one bin may be associated with a first priority level, another with a second priority level, etc. Thus, events may be queued according to these bins, and consequently according to their priority.

In one embodiment, event queue 540 may comprise logic operable to prioritize events in the hardware buffer, such that events received in one order may be organized in the hardware buffer for presentation to event generator 520 based on this prioritization. This prioritization may comprise look ahead scheduling based on the opcodes associated with one or more of the events in the hardware buffer or may be based on a priority previously associated with the event.

Figure 8:
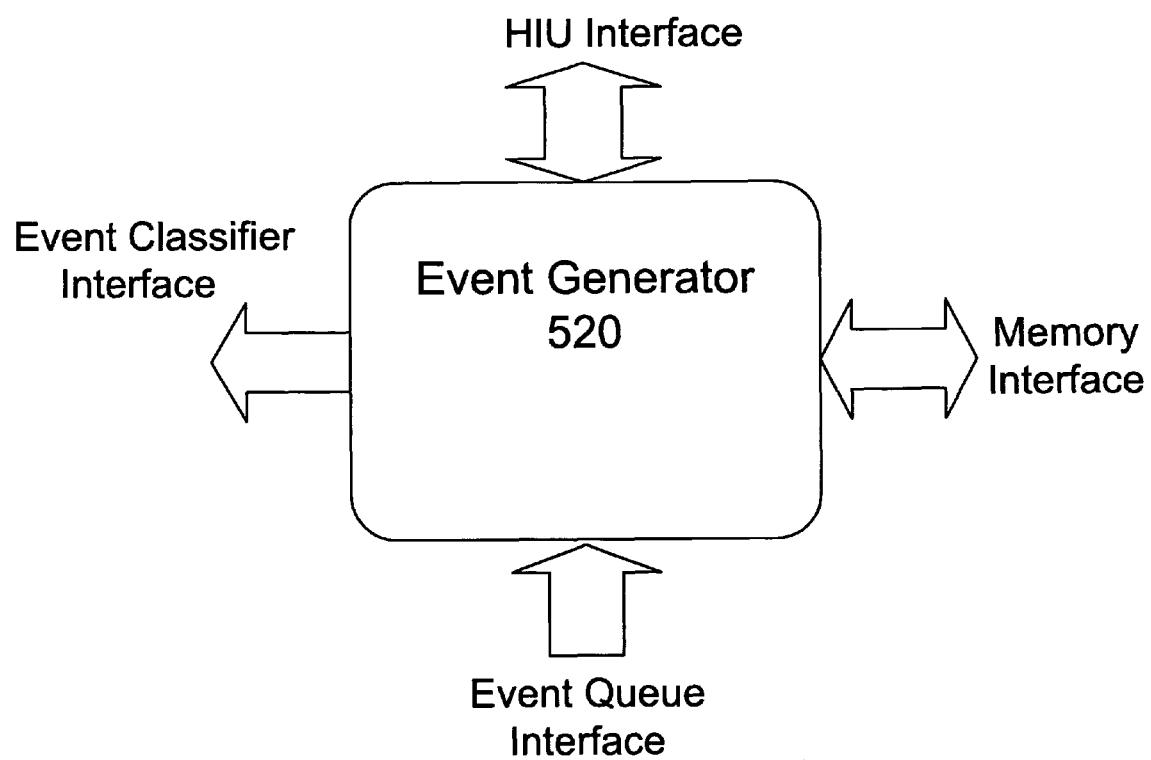
FIG. 8 depicts one embodiment of an event generator.

Moving to FIG. 8, one embodiment of an event generator is depicted. Event generator 520 may receive events from event queue 510, obtain the opcode and context associated with the event and execute the event, pass the event to event classifier 510 or generate new events (e.g. generated events) based on the opcode or the context. For example, if the event comprises a command to be performed on multiple nodes (e.g. the context of an event references an expression match list 480) event generator 520 may generate an event for each of the multiple nodes for which the instruction is to be performed, such that the processing of the instruction with respect to each of the multiple nodes may occur substantially in parallel through the processing of each of these generated events. Another example may be if the context of an event depends on any run-time evaluation, for example run time context. In this case, an event may be generated with the proper context according to the runtime environment (e.g. nodes may be associated with events based on the runtime context). These generated events may be routed to event classifier 510.

Event generator 520 may also comprise hardware circuitry for performing one or more functions associated with the execution of certain opcodes such that event generator 520 executes certain received events using this hardware functionality. In addition, event generator 510 may comprise dedicated hardware for the location and extraction of document nodes for the generation of events. Event generator 520 may also log or generate warnings or errors to the HIU 310 through, for example, LCB 380. These errors may comprise errors encountered during the execution of one or more events, for example informing HIU 310 that instructions in the instruction table are invalid, processing exceptions (e.g. created by execution of microcode on an application engine 550), problems with a structured documents being processed, memory errors, hardware malfunctions, etc. Additionally, based on a received event, HIU 310 may request the evaluation of certain processes, such as security processes, the execution of scripts not supported by transformation engine 340, etc. These processes may be evaluated by a host and the result returned to event generator 520.

Figure 9:
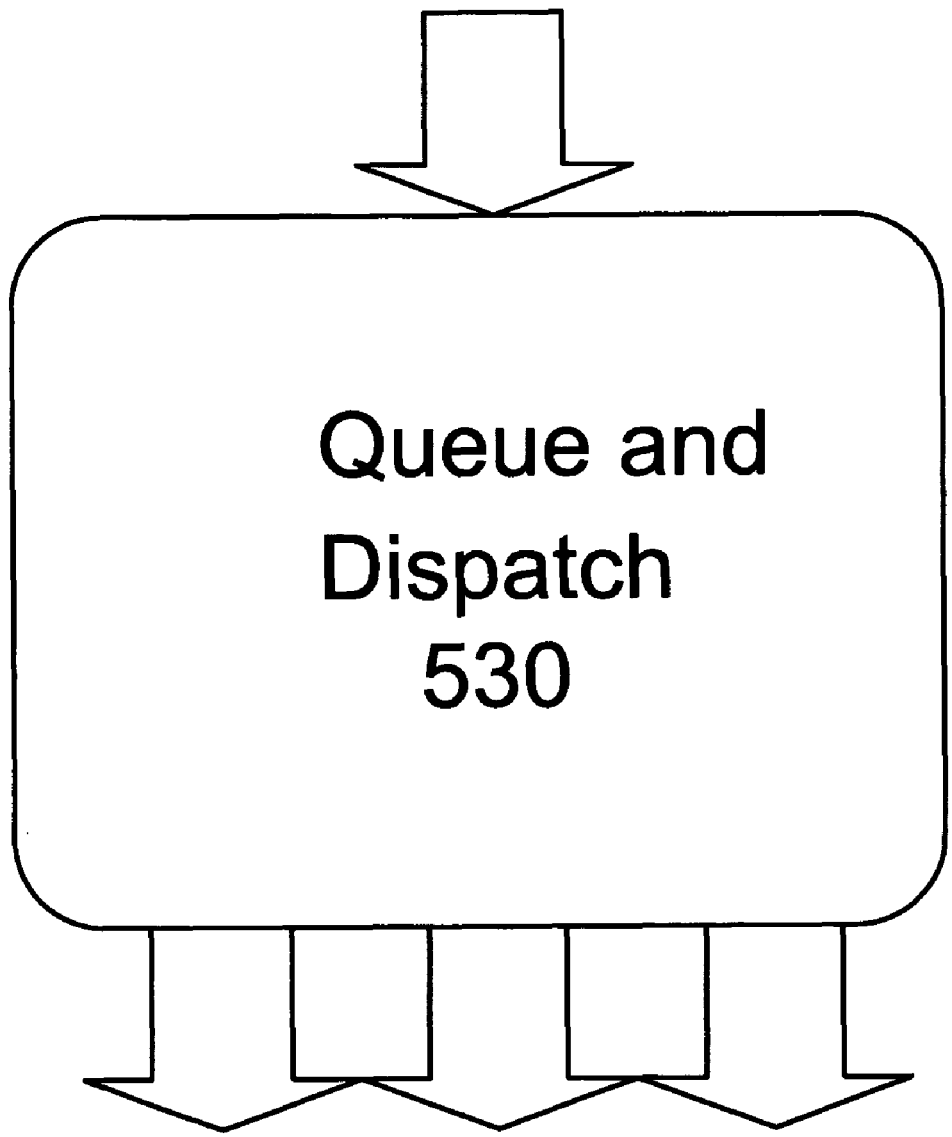
FIG. 9 depicts one embodiment of a dispatch queue.

Looking now at FIG. 9, one embodiment of a dispatch queue is depicted. Dispatch queue 530 may comprise a FIFO queue, where events are placed at the end of the queue by event classifier 510 and distributed from the front of the queue to one of application engines 550 or hardware accelerators 560. Dispatch queue 530 may be operable to implement a scheduling algorithm such that the number of events received by each of application engines 550 is relatively equal (e.g. a balanced scheduling algorithm). It will apparent that dispatch queue 530 may be adapted to almost any scheduling algorithm desired with respect to events within the queue such that events within the queue may be reordered according to this scheduling algorithm.

Figure 10:
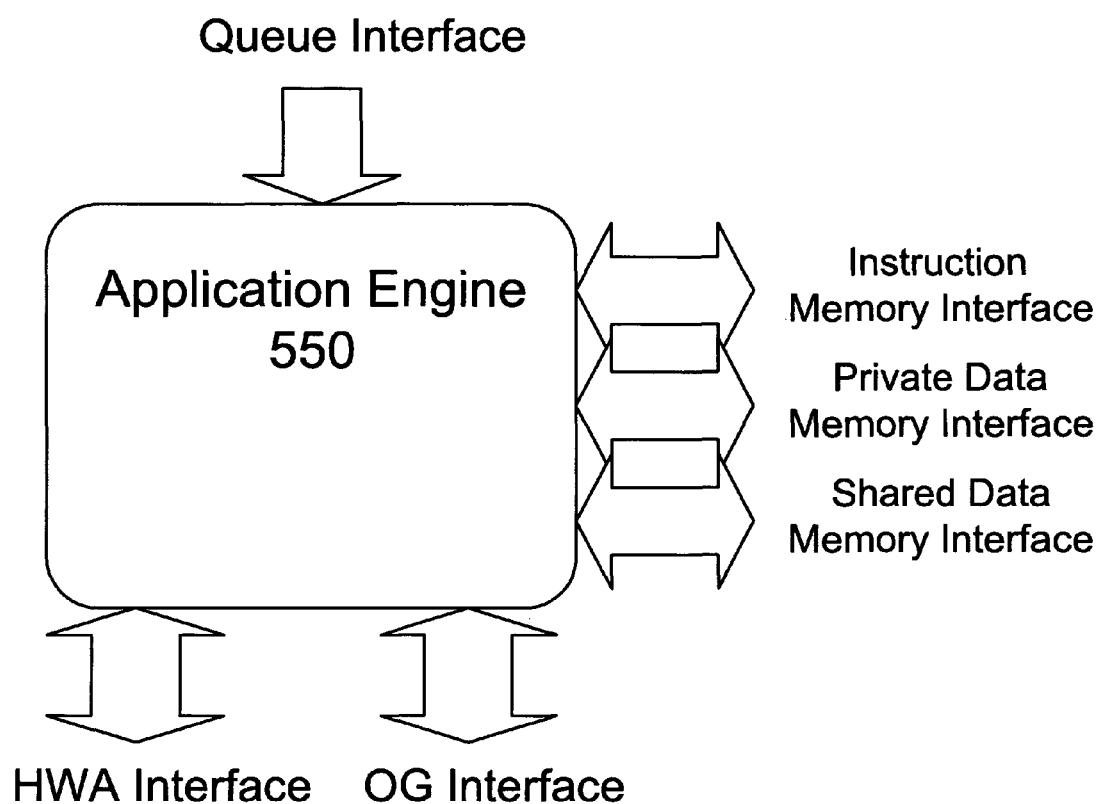
FIG. 10 depicts one embodiment of an application engine.

Moving on to FIG. 10, one embodiment of an application engine is illustrated. In one embodiment, transformation engine 340 may have 8 application engines 550. Each application engine 550 may comprise a processor core with a 32-bit reduced instruction set code (RISC) pipelined architecture and IEEE 754 compliant double precision floating point hardware circuitry. This processor core may be a general purpose processor core, such as that utilized in microprocessors as are known in the art, or may be a proprietary processor cores specially adapted for the functionality described herein. Application engine 550 may have three memory interfaces, an instruction memory interface, a private data memory interface, and a shared data memory interface. Application engine may also have an interface to one or more hardware accelerators (which may or may not be equivalent to hardware accelerators 560) and output generator interface 590.

Application engine 550 may be operable to fetch an instruction from the front of dispatch queue 530, obtain the opcode from the fetched event and obtain microcode associated with the opcode (e.g. from a library), where the microcode is operable to be executed on the application engine 550 to accomplish the functionality of the opcode. In particular, this microcode may comprise instructions of an instruction set operable to be executed by the processor core of the application engine 550. This microcode may be executed on the application processor 550 with respect to the context of the event. When executing events from dispatch queue 530, application engine 550 may utilize instruction memory interface or private memory interface to store data unique to the application engine 550, for example cache data unique to that application engine 550, and shared data memory interface to store and retrieve data which may be accessed by each of application engines 550, such as data for maintaining coherency between application engines 550.

During processing of an event, application engine 550 may send one or more events to a hardware accelerator 560, which may be operable to process this event, or an action associated with the event, more quickly or efficiently that application engine 550, and may have dedicated hardware directed to that task. Events from application engine 550 intended for a hardware accelerator 560 may be placed in a FIFO queue associated with the destination hardware accelerator through an interface associated with the hardware accelerator 560. This FIFO queue may be implemented in hardware or memory 270.

The processing of an event may also result in the desire to obtain information from output generator 590, or output which application engine 550 (or, in some embodiments, hardware accelerator 560) desires to communicate to output generator 350. These communications between application engine 550 (or hardware accelerator 560) and output generator 350 may occur through output generator interface 590, through which application engine 550 (or hardware accelerator 560) may request a reference to an output data structure 490 (e.g. an output table) from output generator 350, request that an output data structure 490 be created by output generator 350, or place output data in a FIFO queue associated with output generator 350, such that output data may be placed in an extant output data structure 490.

Alternatively, the processing of an event may result in the generation of one or more events which require processing. These events may be placed in event queue 540 by application processor 550 (or, in some embodiment, by one of hardware accelerators 560). For example, certain events may comprise variable dependencies which may not yet be in a valid state (e.g. these dependencies have not been resolved), or an output data structure where output from the event is to be placed is in the process of being constructed, etc. These events may be "recirculated" or placed in event queue 540 such that dependencies, etc. may be resolved before they are processed. Application engine 550 may also change a priority associated with such an event before the event is placed into event queue 540.

Referring briefly again to FIG. 5, transformation engine 340 may begin processing of a document when a new job request is received from HIU 310 at event generator 520 through LCB 380. This job request may comprise information such as a job number, a root output document context, a stylesheet context, a document priority, etc. This job request may be issued from HIU 310 when front end processing has been performed on the document by processor 210. In other words, transformation engine 340 may process a document once parser 320 and PEP 330 have completed processing the document.

In response to receiving the request from HIU 310, event generator 520 generates an initial event comprising the information received with the job request to trigger a set of initialization operations associated with the job. This initial event may be then be passed from event generator 530 to event classifier 510 which forwards the initial event to dispatch queue 540, from where it eventually gets processed by one of application engines 550. The processing of the initial event by application engine 550 causes a number of initial setup actions to take place. These setup actions may be operable to set up the runtime context for the processing of the job and may include: loading context information associated with a root template of a stylesheet into memory, a request to issue to output generator 350 to allocate a root output data structure, and a root context to be constructed including associating the root context with the root template, and a reference to an output data structure obtained from output generator 350. Event classifier 510 may then fetch an initial instruction from instruction table 430 and processing the document(s) associated with the job request may take place by transformation engine 340.

During operation of transformation engine 340, event generator 520 may serve as a natural throttling function for transformation engine 340. As events generated at event generator 520 and events received from event queue 540 may be passed from event generator 520 to event classifier 510 before eventually being dispatched (or passed again to event queue 540), event generator 520 may be a central place from which throttling of the dispatch of events to be processed by transformation engine 340 may occur. This throttling may occur as a byproduct of the operation of event generator 520 (i.e. events are only dispatched from event generator 520 as quickly as event generator 520 can generate events or pass events to event classifier, or may be controlled from an external source, such as HIU 310 or a host (not shown).

In the foregoing specification, the invention has been described with reference to specific embodiments. However, one of ordinary skill in the art appreciates that various modifications and changes can be made without departing from the scope of the invention as set forth in the claims below. For example, more or fewer application engines or hardware accelerators may be utilized as desired, the application engine may use almost any type of processor core, etc. Accordingly, the specification and figures are to be regarded in an illustrative rather than a restrictive sense, and all such modifications are intended to be included within the scope of invention. For example, it will be apparent to those of skill in the art that although the present invention has been described with respect to a protocol controller in a routing device the inventions and methodologies described herein may be applied in any context which requires the determination of the protocol of a bit stream.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. An apparatus, comprising:
a hardware circuit operable to execute a set of instructions to transform a structured document, wherein the set of instructions was created by compiling a set of transformation instructions for the structured documents and the hardware circuit comprises a set of application engine circuits operable to execute the set of instructions;
an event classifier circuit operable to:
retrieve an instruction from the set of instructions, wherein the instruction comprises an opcode and a first reference to a set of nodes, a first reference to a data structure or a first reference to an instruction table,
generate a first event from the instruction, where the first event comprises the instruction and a runtime context for processing the instruction, and place the first event in a queue to be dispatched to one of the set of application engines or a set of hardware accelerators; and an event generator circuit operable to generate a second event from the first event, where the second event comprises the opcode of the instruction, wherein the second event comprises a second reference to one or more of the set of nodes, a second reference to the data structure or a second reference to the instruction table.

2. The apparatus of claim 1, wherein:

the event generator circuit is operable to reference a set of data structures corresponding to the structured document to generate the second event, and each application engine is operable to:

generate a first request for the creation of an output data structure based on the execution of the event, generate a second request for the creation of an output data structure based on the execution of the event, and access a set of microcode instruction associated with the opcode of the event, each application engine comprising a processor core operable to execute the set of microcode instructions.

3. A method for applying transformation instructions to a document, comprising:

accessing a set of instructions, wherein the set of instructions was created by compiling a set of transformation instructions and the set of instructions is executable on a hardware circuit operable to transform a structured document according to the transformation instructions;

executing, on the hardware circuit, the set of instructions to transform the structured document according to the set of transformation instructions;

generating a first event from an instruction where the event comprises a first instruction, wherein the first instruction comprises an opcode and a first reference to a set of nodes, a first reference to a data structure or a first reference to an instruction table;

generating a second event from the first event, where the second event comprises the opcode, wherein the second event comprises a second reference to one or more of the set of nodes, a second reference to the data structure or a second reference to the instruction table; and executing the second event in parallel with one or more other events on the hardware circuit.

4. The method of claim 3, wherein generating the second event comprises accessing a set of data structures corresponding to the structured document.

5. The method of claim 4, further comprising:

producing a set of output data structures corresponding to an output document associated with the structured document, where the output data structures are the result of the execution of the instruction code;

requesting that one of the set of output data structures be created; and requesting that a result from the execution of the event be associated with one of the output data structures.

* * * * *